July 7, 1970 R. REMANE 3,519,035
VOLUMETRIC DOSING DEVICE
Filed March 19, 1968 6 Sheets-Sheet 1
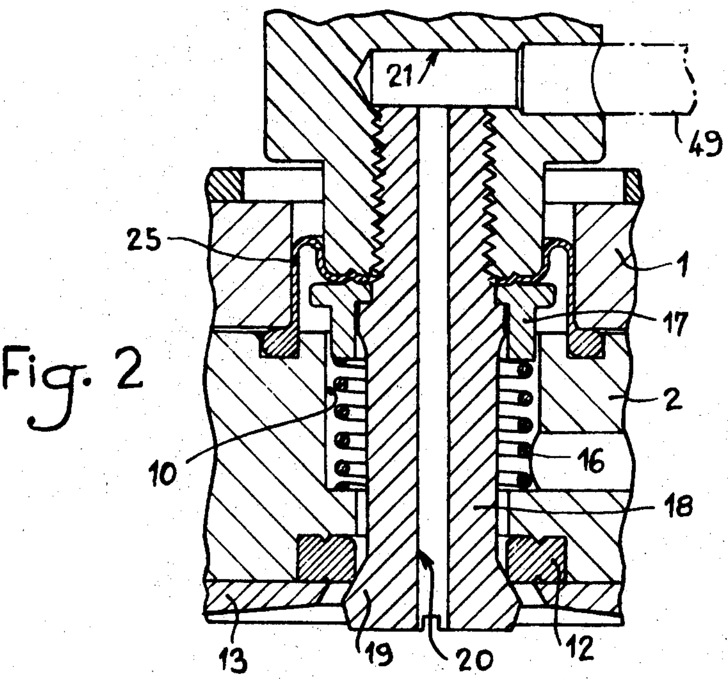
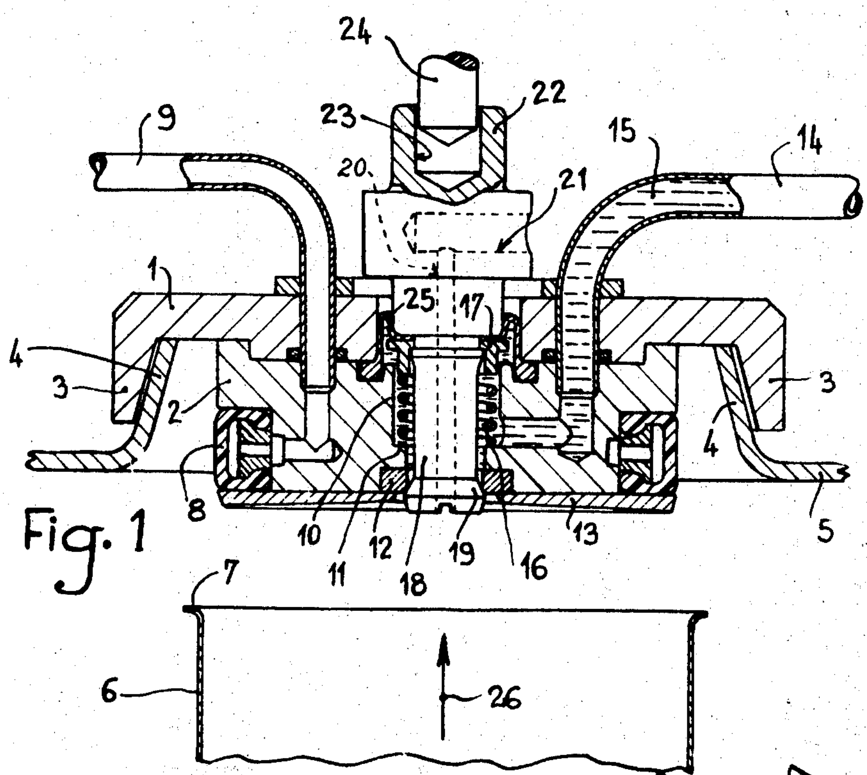
INVENTOR
Roger Remané
BY
ATTORNEYS INVENTOR
Roger Remané

BY Alexander Dowell

ATTORNEYS

VOLUMETRIC DOSING DEVICE

Filed March 19, 1968 6 Sheets-Sheet 3

Roger Remané INVENTOR

BY Alexander Wood ATTORNEYS

VOLUMETRIC DOSING DEVICE

Filed March 19, 1968

INVENTOR
Roger Remané

BY
Alexander Dowell

ATTORNEYS

VOLUMETRIC DOSING DEVICE
Filed March 19, 1968 6 Sheets-Sheet 5
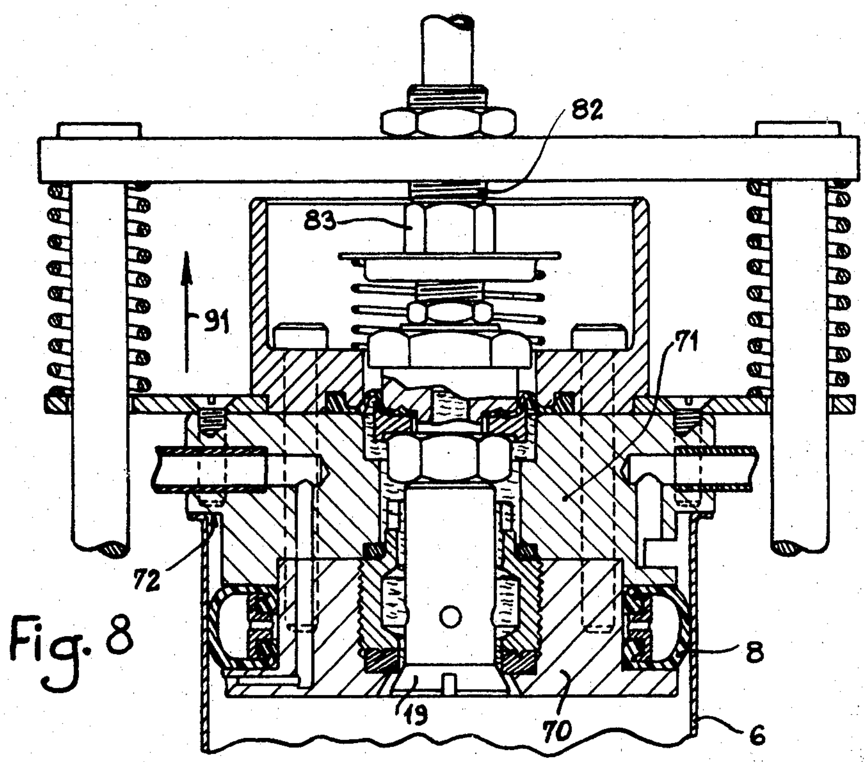
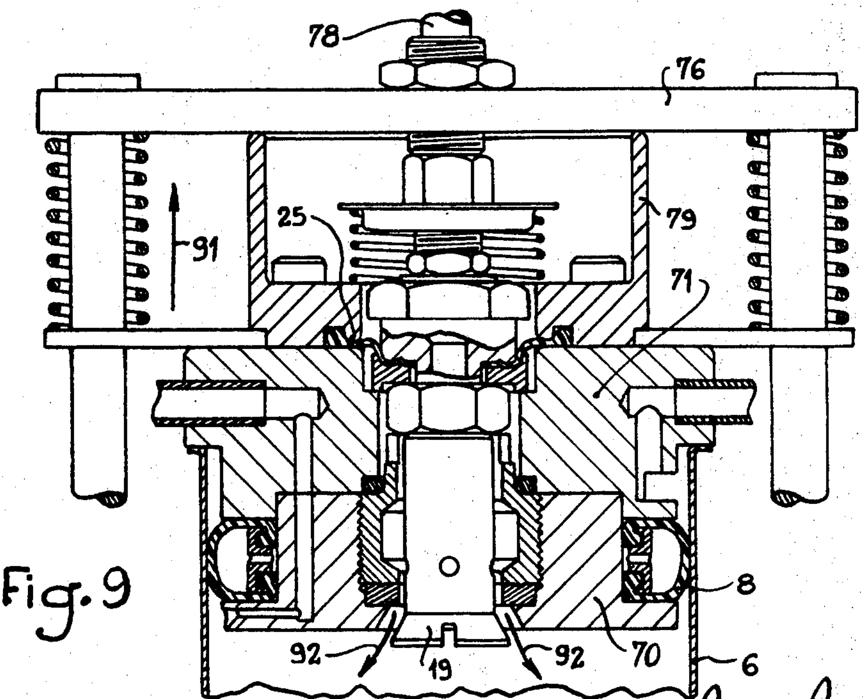
INVENTOR
Roger Remané
BY Alexander & Dowell
ATTORNEYS

VOLUMETRIC DOSING DEVICE

Filed March 19, 1968 6 Sheets-Sheet 6

INVENTOR
Roger Remane

BY Alexander & Dowell

ATTORNEYS

United States Patent Office 3,519,035
Patented July 7, 1970

3,519,035

VOLUMETRIC DOSING DEVICE

Roger Remane, Sainte Colombes-les-Vienne, France, assignor to Application des Gaz, Paris, France, a French joint-stock company Filed Mar. 19, 1968, Ser. No. 714,236
Claims priority, application France, Mar. 23, 1967, 48,438
Int. Cl. B65b *31/00;* B67c *3/26*
U.S. Cl. 141—52 6 Claims

ABSTRACT OF THE DISCLOSURE

A vessel is raised under a vertically movable base having a lower portion which fits into the upper part of the vessel and a larger upper portion. A seal provides a fluid-tight connection between the lower portion and the vessel and as the vessel raises the upper portion, it opens a valve through which the liquefied gas may fill the vessel up to the seal the air and excess liquid being evacuated through a vent into a collecting tank or into another vessel ready to be filled under its individual base.

The present invention relates to a volumetric dosing device intended to be used with low temperature liquids such as, for instance, liquefied butane or propane. Owing to the fact that such liquids have solvent properties, it is substantially impossible to achieve a good lubrication of the members with which they are brought into contact. Besides, the fact that they form an explosive mixture when they get mixed with air imposes special safety conditions. It is difficult to meet said conditions, because of the low working temperature required and the icing risks resulting therefrom: by way of example, when using liquid butane, the working temperature is about −20° C.

The main object of the present invention is to obviate the above-mentioned drawbacks, by providing a suitable dosing device adapted, besides, to enable a great number of vessels or cans to be filled simultaneously with a liquefied combustible gas.

As is known, on grounds of safety and because of the expansion problems encountered, the cans of butane or propane should not be filled completely, so as to provide a gaseous atmosphere over the liquid they contain. A further object of the present invention is to provide an arrangement enabling each can or canister to receive exactly the dose of liquid required.

The volumetric dosing device according to the invention is characterized in that it comprises a horizontal base movable in a vertical direction, inside which a valve is disposed, which valve opens downwards and is returned upwards onto its seat by a closing spring, while a liquid inlet is provided in said base round said valve, between the lower seat of the latter and a flexible sealing membrane connecting said valve with said base, the top of said valve being adapted to come into contact with a stop when said base is lifted to a sufficient extent, an inflatable annular gasket being, besides, provided round the lower part of said base in a manner such as to flatten itself tightly against the inner wall of a canister to be filled, the delivery of compressed fluid to said gasket being brought about automatically by said canister being lifted, which carries along said base and said valve, the latter being further provided with inner bores connecting directly the inside of said canister with the outer atmosphere in the course of the filling with the feed liquid during a predetermined period of time.

It will be seen that such a device is adapted to operate without it being necessary to provide a constant level tank for the feed liquid. This is particularly advantageous when said liquid is difficult to handle, as is the case for butane and propane.

For a better understanding of the invention, the latter will now be further described, with reference to the appended diagrammatic drawing, given merely by way of example to illustrate the features of said invention and the advantages provided thereby. In said drawing:

FIG. 1 is an axial section of a dosing device according to the invention, as shown at rest, just before a canister is going to be fitted thereon to be filled with a given amount of liquid;

FIG. 2 is an axial section of the valve of said device and its fittings, in its closed position;

FIG. 8 is an axial section of same, showing the parts thereof at the moment a canister to be filled starts lifting the movable base of the device, after the inflatable gasket of the latter is inflated;

FIG. 9 is an axial section showing said parts at the time the valve of said device opens, towards the end of the upward travel of said movable base;

Figure 3:
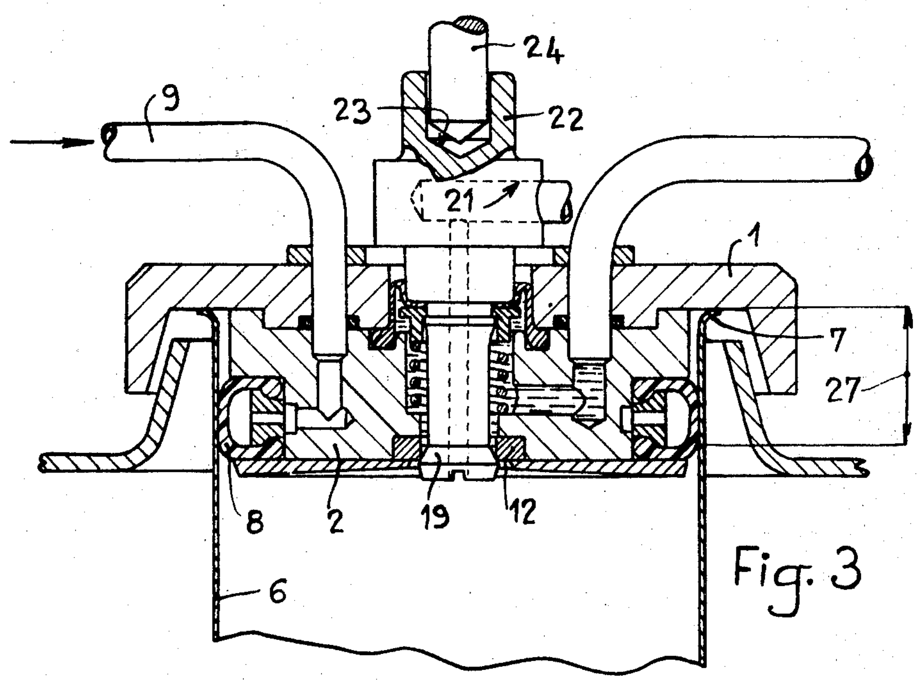
FIG. 3 is a figure similar to FIG. 1, showing the device of the invention at the time its base and its valve start being lifted by means of a canister.

Referring now to FIGS. 1 to 5, the dosing device of the invention includes a movable base made of two superposed plates 1 and 2, as shown in FIG. 1. Preferably, said plates are made of a superpolyamidic material. The upper plate 1 overlaps the lower plate 2, and is provided with a peripheral flange 3, which is directed downwardly and surrounds said lower plate 2. Said flange is used for topping the upper frustoconical edge 4 of a supporting plate 5, in which a circular opening is cut off at said location. When the whole device is at rest, that is, when the upper plate 1 rests on the top of the edge 4, as shown in FIG. 1, the lower plate 2 is hanging at the center of said opening in the supporting plate 5.

Figure 4:
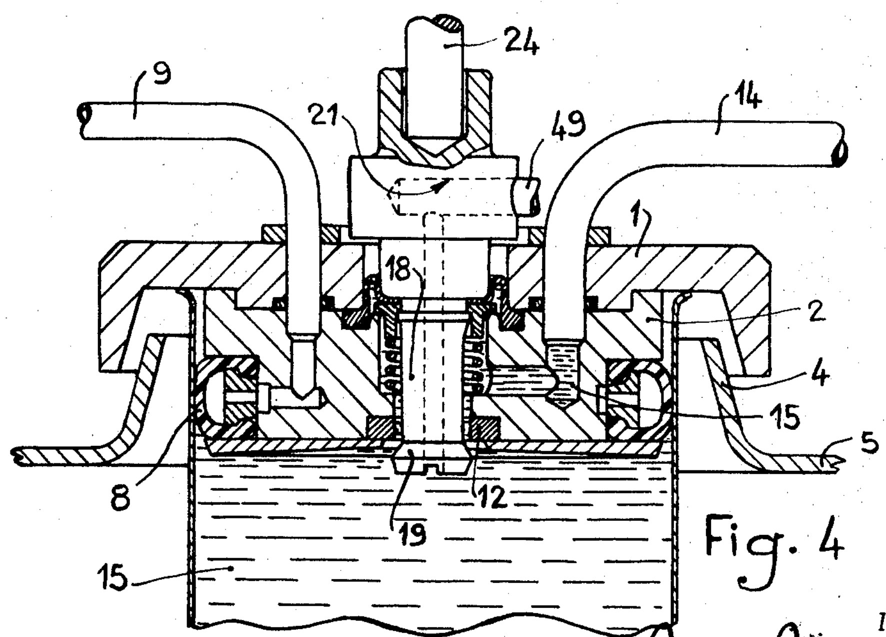
FIG. 4 shows the whole assembly at the end of the filling operation.

This assembly is adapted to ensure the filling of a cylindrical can or canister 6, or the like vessel, the upper edge 7 of which is designed to be provided with a head or cover by a subsequent operation such as, for instance, crimping. The diameter of the lower plate 2 is smaller than the inner diameter of said can 6, so that the latter can be fitted upwards round said plate 2, till it butts against the plate 1, as shown in FIGS. 3 and 4.

The lower end of the lower plate 2 is, besides, provided with a groove, which accommodates a hollow flexible annular gasket 8, the latter being inflatable. The inflation of said gasket is performed by means of a compressed air line 9 mounted on the movable base 1–2.

A bore 10 passes through the center of said base 1–2. The lower part of said bore includes a transverse shoulder 11, below which an annular sealing seat 12 is mounted. The assembly is completed by a plate 13 made, for instance, of a material such as polytetrafluoroethylene, which plate covers the underface of the plate 2, so as to prevent any icing on the latter, notwithstanding the working temperatures, which are generally lower than −20° C.

A line 14 connects the base 1–2 with a source (not shown), which supplies the pressurized liquid 15, a given dose of which is to be poured into the can 6. Said line 14 is flexible, so as to allow the base 1–2 moving freely with respect to the supporting plate 5, and opens laterally into the bore 10, above the shoulder 11. The liquid 15 may be butane, or propane, or the like.

A helical compression spring 16 is housed inside the bore 10. The lower end of said spring bears on the shoulder 11, while its upper end tends to lift a socket 17 integral with the rod 18 of a closing valve 19. Said rod 18 extends centrally downwards through the bore 10, and its lower end is provided with the valve 19, the latter being adapted to be applied upwards against the sealing seat 12, under the returning action of the spring 16.

An axial bore 20 passes through said valve 19 and the rod 18 thereof, the upper end of said bore 20 opening into the atmosphere, directly or otherwise, through the medium of a transverse passage 21. Above the latter, the movable valve 18–19 ends in a sleeve 22, provided centrally with a blind cylindrical housing 23, the axis of which is vertical. Said housing opens upwards, and fits round a stop 24, with respect to which said sleeve 22 moves freely.

A flexible membrane 25, made of a material remaining flexible at low working temperatures, is mounted between the base 1–2 and the valve 18–19–22, above the outlet of the line 14, so as to form a sealing wall enabling said valve to move freely with respect to said base.

Lastly, means, not shown in FIGS. 1–4, are provided for sending compressed air automatically into the line 9, as soon as the base 1–2 starts being lifted above the stationary supporting plate 5. Said means may consist of a timing mechanism or an arrangement with stops and followers, as will be described with reference to FIG. 5. Besides, the line 14 is constantly fed with liquid 15.

The operation of the dosing device according to the invention is as follows:

In order to send a given dose of liquid 15 into a can 6, the latter is disposed below the dosing device, as shown in FIG. 1, and raised in the direction shown by the arrow 26. Of course, said raising can be performed by any automatic means. As soon as the upper edge 7 of said can 6 comes to gear against the plate 1, the base 1–2 starts being lifted together with the can 6, as shown in FIG. 3, and the line 9 is automatically supplied with compressed air, which causes the gasket 8 to be inflated, so that the latter is applied sealingly against the inner wall of the can 6. It should be noted that said sealing contact is obtained at a certain distance 27 below the upper edge 7 of said can.

At the beginning of said lifting motion, the valve 19 remains closed on its seat 12, while traveling with the base 1–2. The sleeve 22 slides round the stop 24, and the bottom of the blind housing 23 comes ultimately to bear against said stop.

From this moment, the valve 19 remains immobilized, while the can 6 goes on rising together with the base 1–2. The seat 12 opens above the valve 19, and the liquid 15 sent through the line 14 flows into the can 6. The duration of said flow is set with a slight excess, that is, the flow is allowed to go on till the liquid flows back into the bore 20 in the valve 19. In the event of an excess supply of liquid, the overflow escapes outwardly through the transverse passage 21, runs then over the top of the plate 1, and is collected round the raised edge 4 of the supporting plate 5.

When the filling time is up, the can 6 is lowered, which causes the base 1–2 to fall back onto the valve 19, after which the reclosed assembly 1–2–12–19 travels down to the resting position illustrated in FIG. 1. At the end of said travel, the line 9 is connected up with the atmosphere by a mechanism reverse to that which had supplied it with compressed air. The gasket 8 goes flat, and the can 6 containing the dose desired of liquid 15 is lowered.

The operating cycle is then ready to start again, and it will be seen that the device of the invention is well suited to operate automatically for mass production.

Figure 5:
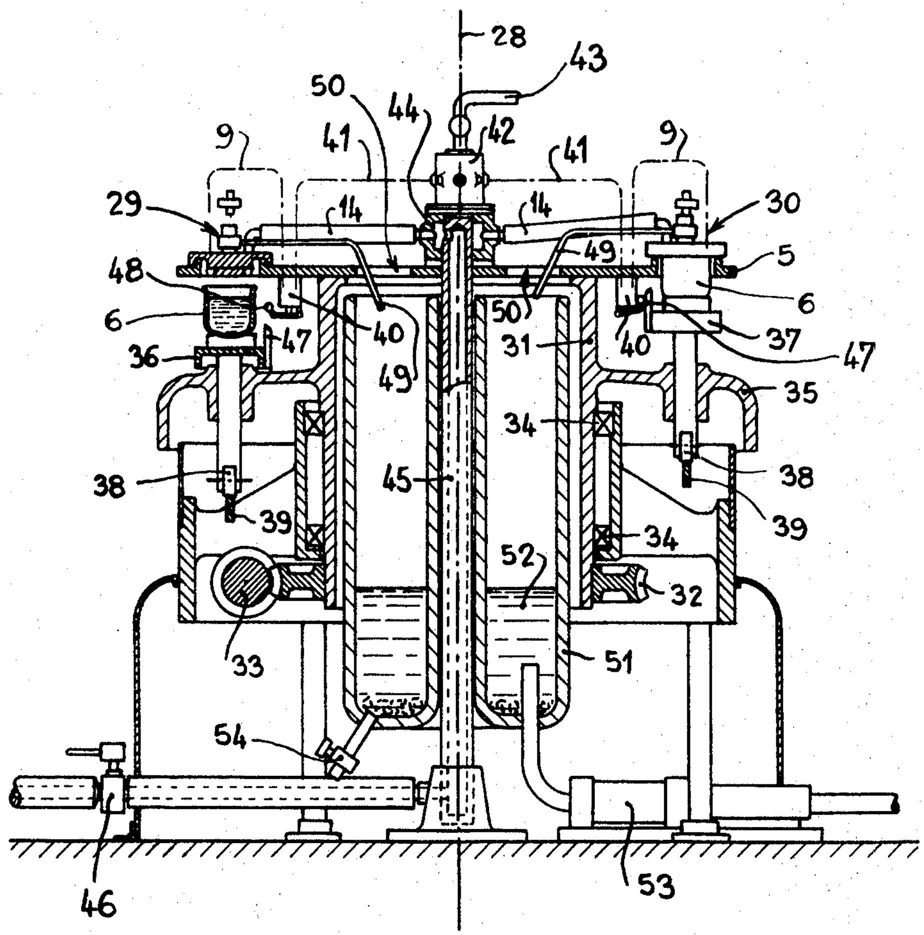
FIG. 5 shows in axial section an automatic machine provided with dosing devices according to the invention.

Referring now to FIG. 5, the latter shows an automatic machine including a number of dosing devices according to the invention, which are distributed round a vertical axis 28. Said dosing devices are mounted on the same supporting plate 5, the latter being stationary in a vertical direction, but adapted to rotate round said axis 28. Said devices are distributed along a circumference centered on the axis 28. Only two of such dosing devices are shown in the sectional view of FIG. 5, and are designated by the general references 29, 30.

The plate 5 is integral with a hollow cylindrical support 31, driven by a mechanism including a helicoidal wheel 32 and a worm 33. Said support 31 is directed vertically, and rests on bearings 34, which enable it to revolve round the axis 28.

The cans 6 to be filled are carried by trays, each of which is secured to a rod adapted to move vertically within a base 35, the latter revolving together with the support 31, of which it forms a part. Two such trays are shown in FIG. 5 under the reference numbers 36, 37. The lower end of the rod of each tray is provided with a cam follower 38, which travels on the upper surface of a stationary cam 39 as the support 31 revolves round the axis 28. Said cam 39 raises the tray and lowers it, once per revolution. Thus, if an empty can 6 is placed on the tray 36 when the latter is in its lowermost position, as shown on the left hand side in FIG. 5, said can is automatically applied under the dosing device 29 after the assembly has revolved by half a revolution, that is, when the tray 36 is in the position shown in FIG. 5 for the tray 37. The can 6 receives therefore the required dose of liquid butane or propane, after which it is brought back to its lowermost position when the tray 36 comes back to the position shown on the left hand side in FIG. 5. Said filled can is then removed, and replaced on the tray 36 by another empty can.

The supply of compressed air is performed, as described hereinabove, by lines 9, each of which is controlled by a distributing gate 40. Said gates 40 are carried by the plate 5, and receive compressed air from a line 41, which is connected with a single fixed inlet line 43 by means of a rotary joint arrangement 42. Said arrangement 42 is centered on the axis 28, together with a rotary distributing head 44, the latter sending the liquid propane or butane to the above-mentioned lines 14, from a stationary duct centered on the axis 28. Said duct 45 receives the liquid from a control gate disposed at the lower part of the machine.

In the example illustrated in FIG. 5, each tray 36, 37 is integral with a stop 47, which actuates the control lever 48 of the respective gate 40 to cause automatically the inflation of the gasket 8 when a can 6 is in its filling position, as shown on the right hand side in FIG. 5, and the deflation of said gasket when said can is lowered again.

It is advantageous not to let the overflow and vent passages 21 (cf. FIG. 4) open freely into the atmosphere, but to connect them with tubes 49, as shown in FIG. 5, said tubes passing through openings 50 in the plate 5 and opening into a heat-proof vessel 51, which surrounds the duct 45. Said vessel 51 is intended to collect the liquid butane or propane 52 flowing through the tubes 49.

When the liquid level in said vessel exceeds a predetermined height, an automatic device of known type (not shown), starts up a discharge pump 53.

Lastly, a drain cock 54 is provided at the bottom of said heat-proof vessel 51.

The operation of said machine will be apparent from the foregoing. Besides, it will be seen that the particular arrangement illustrated in FIG. 5 is advantageous in that it removes any risk of icing for the dosing devices, because at the level of the latter the liquid butane or propane never happen to be in contact with the surrounding air.

In the modified embodiment of the dosing device according to the invention as illustrated in FIGS 6–11, the movable base is constituted by two members 70, 71, the member 71 being the upper plate, provided with a shoulder 72 adapted to be used as a stop for the cans, said member 71 extending downward, besides, to form a lower plate portion. As will be seen, however, such a constructing disposition, which allows mounting the inflatable gasket 8 more easily, does not modify the invention in any way.

The base 70–71 is integral with two radial arms 73, which slide vertically on two stationary guiding rods 74. Each of said rods 74 is surrounded by a helical return spring 75, disposed between the radial arm 73 and the stationary arm 76 carrying said rods.

The bore 10 of said base 70–71 defines a chamber 77, the lower end of which opens at the center of the annular sealing seat 12 adapted to receive the frustoconical section of the movable closing valve 19. A flexible membrane 25 seals the top of said chamber 77.

The rod 18 of the valve 19 is hollow, and its upper end is connected with a flexible line 78 connected with a source (not shown) of liquid butane or propane. Said source may merely be a tank mounted with a pressure head, without it being necessary to insert any time delay device at the liquid inlet to said line 78.

The movable base 70–71 is integral with a casing 79, which tops it, and at the center of which a spring 80 is disposed. Said spring 80 is very flexible, and aims merely at compensating the inherent stiffness of the membrane 25, to lift the valve 19 and hold same applied on its seat 12. Said spring 80 surrounds the upper end of the rod 18 of the valve 19, and pushes back the latter upwards, while bearing, on the one hand, on the bottom of the case 79, and, on the other hand, on the underface of a cup 81 integral with the rod 18 and the flexible line 78. The latter slides freely through a socket 82 mounted in the central part of the arm 76, said socket acting as a fixed stop for a nut 83 integral with the rod 18. Said nut 83 is used in particular for ensuring the joining of the flexible line 78, and for holding the cup 81 in position.

A ring 84 is mounted on the upper section of the rod 18, just below the membrane 25, the diameter of said ring being distinctly larger than that of the flared frustoconical lower end of the valve 19. Said ring 84 is integral with the rod 18 of said valve, so that the later is in the shape of a differential piston, the large section being defined by the upper ring 84 and the membrane 25, while the smaller section corresponds to the flared lower end of the valve 19.

Figure 6:
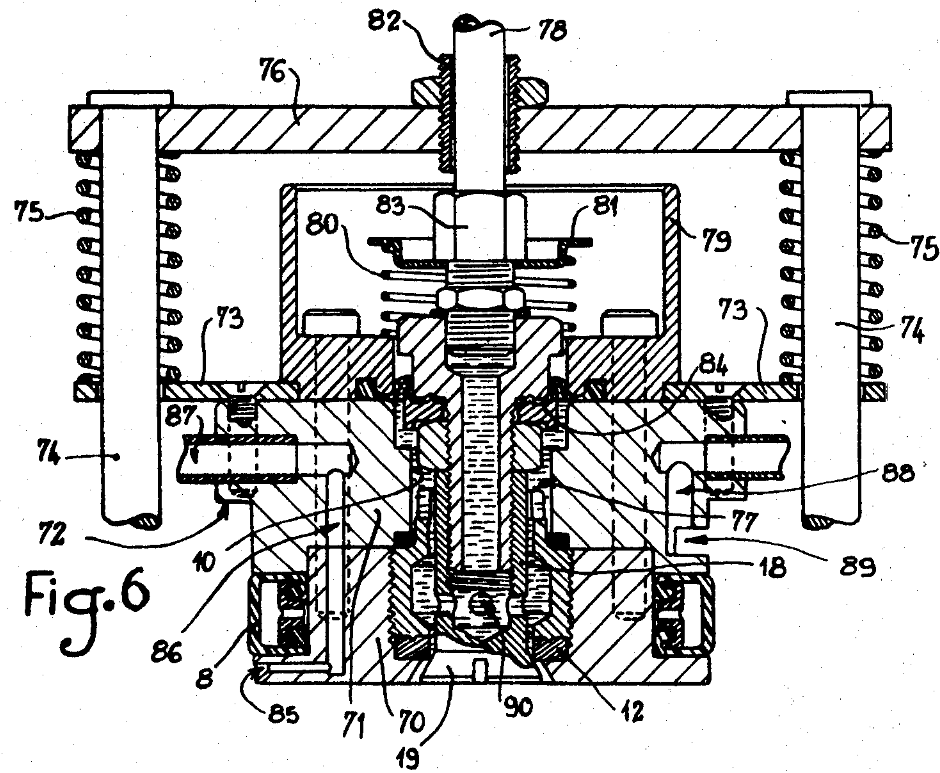
FIG. 6 is a view similar to FIG. 1, but showing another embodiment of a dosing device according to the invention.
Figure 7:
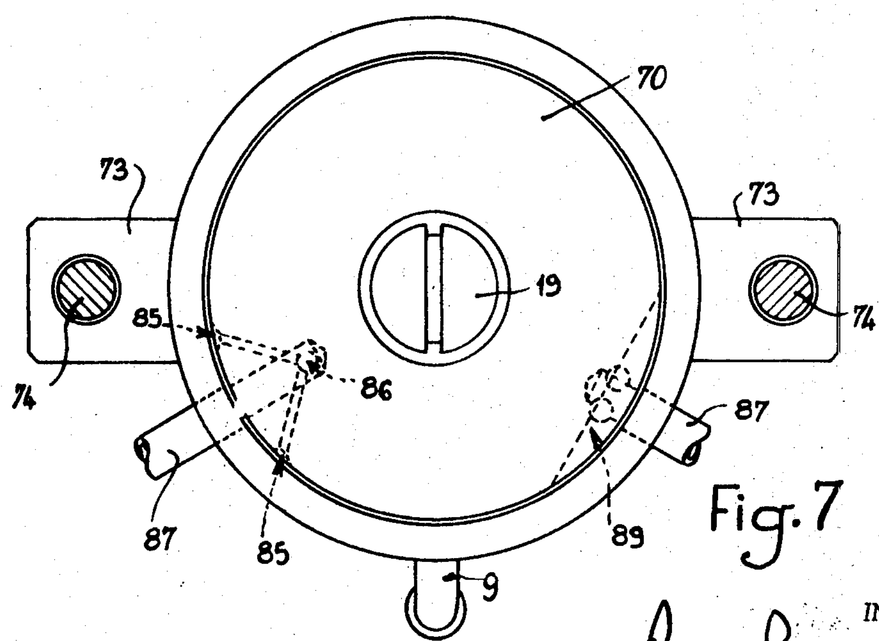
FIG. 7 is a plan view of same, as seen from below.
Figure 11:
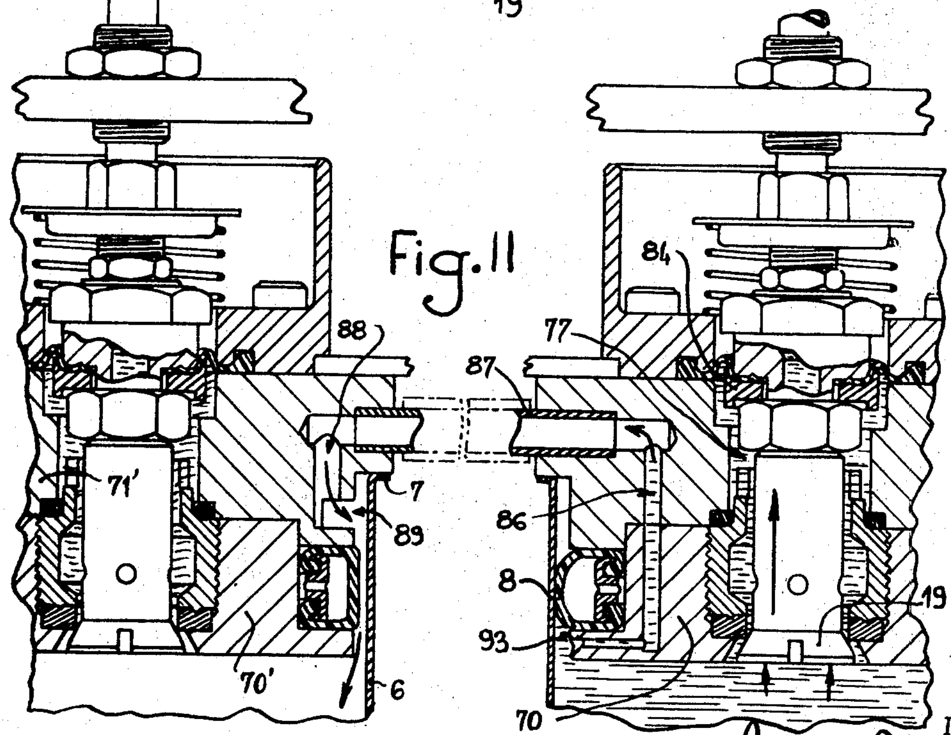
FIG. 11 shows in axial section, respectively: on the right, the device of FIGS. 6–10 at the time its valve closes at the end of the filling operation, and, on the left a similar device in its position at the beginning of the working cycle, before its inflatable gasket is inflated.

Besides, openings 85 are provided on the lateral surface of the lower plate 70, just below the inflatable gasket 8. Said openings 85 open into a vertical passage 86, the section of which is intentionally small, so as to bring about a substantial loss of head when the overflow liquid flows back. A pipe of large section 87 connects the upper end of said passage 86 with another identical dosing device mounted close by, as shown in FIG. 11, said pipe 87 opening then into a vertical passage 88 in the base 70′–71′ of said adjacent dosing device. The passage 88 in each base is provided laterally with a port 89 above the inflatable gasket 8, as shown in FIG. 6. Lastly, the rod 18 of the valve 19 is hollow, and its bottom is provided with radial holes 90, which connect up the chamber 77 directly with the flexible line 78.

The operation of said device is as follows:

The flexible line 78 is constantly supplied with liquid. At rest, as shown in FIG. 6, the valve 19 remains closed under the leading differential effect of hydraulic pressure and the subsidiary effect of the return spring 80.

When a can 6 is disposed under the shoulder 72, as shown in FIG. 8, it begins by lifting the assembly comprising the base 70–71 and the valve 19, the latter remaining closed. The direction of said lifting is shown by the arrow 91. The corresponding period of time is used to inflate the gasket 8 providing a seal on the inner wall of said can 6.

As the upward motion goes on, the nut 83 comes to rest on the lower end of the sleeve 82, whereby the valve 19 is stopped. Since the lifting of the base 70–71 goes on till the top of the case 79 comes to rest on the arm or frame 76, it will be seen that the valve 19 is caused to open positively, as shown diagrammatically in FIG. 9, while the flexible membrane 25 becomes deformed. The liquid butane or propane flows then rapidly to fill the can 6, as indicated by the arrows 92.

Figure 10:
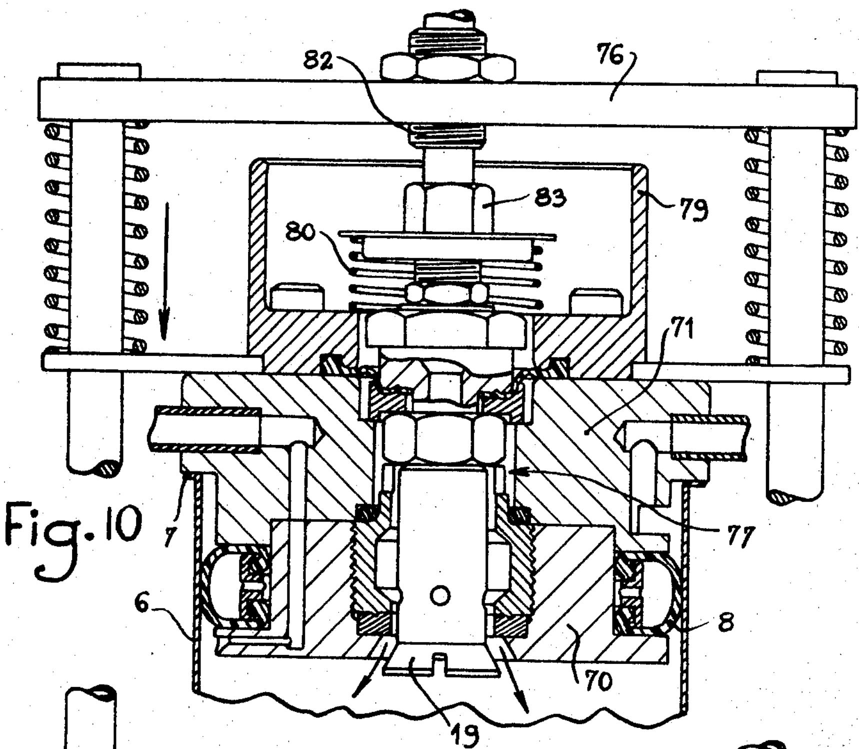
FIG. 10 is an axial section showing said device at the time said canister and said base come down again, while said valve remains open to complete the filling operation.

Before said filling operation is completed, the can 6 is lowered, as shown in FIG. 10. The base 70–71 is lowered as well under the action of the springs 75, so that the case 79 does not bear any longer on the stationary arm or frame 76, and the nut 83 is no longer in contact with the stationary socket 82. The valve 19 does not close again, however, because no back pressure is exerted on its flared lower end as long as the can 6 is not full. The chamber 77 remains empty. The action of the spring 80 is not sufficient to reclose the valve 19 during said stage, because, as previously mentioned hereinabove, said spring is very flexible, and compensates only for the internal resistances of the movable assembly.

On the other hand, when the liquid level reaches the plate 70, as shown on the right hand side of FIG. 11, the can 6 is substantially full, and the chamber 77 fills in its turn, which results in a differential effect tending to lift the ring 84 together with the membrane 25, and to reclose the valve 19 automatically. Meanwhile, the liquid fills almost completely the annular space 92 defined just below the inflatable gasket 8, so that the volume of the residual gaseous space is reduced to a very minimum. As a matter of fact, the air enclosed in the can 6 can be discharged up to the last moment through the openings 85 and the line 87. This arrangement is very advantageous in that it provides a high dosing accuracy.

At the end of the filling operation, some liquid rushes into the passage 86, and tends to be discharged through the pipe 87. However, the overflow discharge thus produced remains very small, firstly because the valve recloses automatically as soon as the can 6 is full, so that the time during which the overflow is allowed to discharge is necessarily very short, and then because the small section of the passage 86 opposes a substantial loss of head to the flow of the liquid, so that any high instantaneous discharge is impossible.

The small quantity of liquid discharged thus through the overflow pipe 87 flows into the passage 88 of an adjacent volumetric dosing device, as shown on the left hand side of FIG. 11, flows therefrom through the port 89, and falls into the corresponding can 6, which is in starting position, ready to start a new cycle.

According to the provisions of the patent statutes, I have explained the principle of my invention, and have described what I now consider to be its best embodiment. However, I desire to have it understood that, within the scope of the appended claims, the invention may be practiced otherwise than as specifically described.

What I claim is:

1. A volumetric dosing device adapted in particular for filling vessels with a liquefied gas up to a given level, characterized in that it comprises a horizontal base movable in a vertical direction and including an upper plate the diameter of which is larger than that of the cylindrical vessels to be filled, and a lower plate of a diameter smaller than that of said vessels, and provided with a peripheral sealing gasket, said base having a vertical bore, the lower end of which is closed by a valve returned to its seat by a spring, said valve being provided with a rod which passes upwards through said bore while being connected sealingly with the latter by a flexible membrane, said valve and said flexible membrane defining inside said bore a chamber connected with the liquid inlet, the upward travel of said rod being limited by a stationary stop, while a discharge passage is provided, which opens substantially level with the underface of said base, in a manner such that, when a vessel disposed under said device is lifted, the upper edge of said vessel fits sealingly round said gasket on the lower plate of said base, and lifts then the upper plate of the latter till said valve rod is stopped by said stationary stop and said valve opens, so as to let the liquid flow into said vessel to fill the same up to the level of said gasket, while the air in said vessel and then the excess liquid escape through said discharge passage.

2. A dosing device as claimed in claim 1, characterized in that said peripheral gasket on the lower plate of said base is an inflatable hollow gasket, means being provided for inflating said gasket automatically as soon as said base is lifted by said vessel to be filled, and for deflating said gasket when said base is lowered again to its resting position.

3. A dosing device as claimed in claim 1, characterized in that said discharge passage is disposed inside said valve and said valve rod.

4. A dosing device as claimed in claim 3, characterized in that said discharge passage opens into a heat-proof vessel.

5. A dosing device as claimed in claim 1, characterized in that said discharge passage is disposed inside said base.

6. A dosing device as claimed in claim 1, characterized in that said base includes a recuperation line, which opens on the periphery of the lower plate of said base, above said sealing gasket, said recuperation line being adapted for being connected to the discharge passage of another dosing device, in a manner such that the excess liquid flowing out of said latter device at the end of the filling of a vessel is collected in another vessel disposed under said former device while awaiting to be lifted, the inflatable gasket on said latter device being thus not inflated yet and allowing therefore said excess liquid to flow.

References Cited

UNITED STATES PATENTS

| | | | |
|---|---|---|---|
| 2,112,199 | 3/1938 | Kantor et al. | 141—287 |
| 2,513,146 | 6/1950 | Carter | 141—287 X |
| 2,893,445 | 7/1959 | Geitner | 141—294 |
| 3,438,790 | 4/1969 | Barnby | 141—287 X |

HOUSTON S. BELL, Jr., Primary Examiner

U.S. Cl. X.R.

141—287, 295, 296